(12) United States Patent
Hau et al.

(10) Patent No.: US 9,664,344 B2
(45) Date of Patent: *May 30, 2017

(54) INDUCTION RECHARGEABLE ELECTRONIC CANDLE SYSTEM

(71) Applicant: Shenzhen Liown Electronics Company Ltd., Minneapolis, MN (US)

(72) Inventors: Daniel Hau, Kowloon (HK); Tim Cowley, Windsor (GB); Shane Vail, Bloomington, MN (US)

(73) Assignee: SHENZHEN LIOWN ELECTRONICS COMPANY LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,819

(22) Filed: Mar. 30, 2015

(65) Prior Publication Data

US 2015/0377431 A1    Dec. 31, 2015

Related U.S. Application Data

(63) Continuation of application No. 13/908,571, filed on Jun. 3, 2013, now abandoned, which is a continuation
(Continued)

(51) Int. Cl.
*F21L 4/08* (2006.01)
*F21S 6/00* (2006.01)
(Continued)

(52) U.S. Cl.
CPC ............... *F21S 6/001* (2013.01); *F21L 2/00* (2013.01); *F21S 9/02* (2013.01); *F21V 23/026* (2013.01); *H02J 7/025* (2013.01); *F21L 4/08* (2013.01); *F21W 2121/00* (2013.01); *F21Y 2101/00* (2013.01); *Y10S 362/81* (2013.01)

(58) Field of Classification Search
CPC .......... F21L 4/08; F21V 23/023; H01M 10/46; H02J 7/025
See application file for complete search history.

(56) References Cited

U.S. PATENT DOCUMENTS 3,277,358 A    10/1966  Nicholl
3,373,274 A    3/1968   Kott
(Continued)

OTHER PUBLICATIONS

Non-Final Office Action for U.S. Appl. No. 12/273,337 mailed Jun. 17, 2011, 16 pages.
(Continued)

*Primary Examiner* — Ismael Negron
(74) *Attorney, Agent, or Firm* — Perkins Coie LLP

(57) ABSTRACT

A large plurality of artificial, battery-operated, electronic candles are arranged to be simultaneously recharged upon placement on a series of interconnected charging trays that include a transformer primary winding at defined locations thereon. The primary windings are driven by an AC signal whose duty cycle is controlled by a pulse width modulator IC to induce a voltage across secondary windings contained within the candle housing. This induced signal is rectified to produce the battery charging current and the delivery of the charging current to the rechargeable batteries is controlled by a microprocessor IC.

16 Claims, 6 Drawing Sheets

Related U.S. Application Data of application No. 13/526,067, filed on Jun. 18, 2012, now Pat. No. 8,454,190, which is a continuation of application No. 12/273,337, filed on Nov. 18, 2008, now Pat. No. 8,210,708.

(51) Int. Cl.
| | | |
|---|---|---|
| *F21S 9/02* | (2006.01) | |
| *F21L 2/00* | (2006.01) | |
| *F21V 23/02* | (2006.01) | |
| *H02J 7/02* | (2016.01) | |
| *F21W 121/00* | (2006.01) | |
| *F21Y 101/00* | (2016.01) | |

(56) References Cited

U.S. PATENT DOCUMENTS

| | | | |
|---|---|---|---|
| 3,418,552 A | 12/1968 | Holmes | |
| 3,675,108 A | 7/1972 | Nicholl | |
| 4,029,954 A | 6/1977 | Moyer | |
| 4,187,532 A | 2/1980 | Naffier | |
| 4,214,185 A * | 7/1980 | Breeze | F21L 4/005 315/86 |
| 4,344,113 A | 8/1982 | Ditto et al. | |
| 4,374,354 A * | 2/1983 | Petrovic | H02J 7/025 15/22.1 |
| 4,554,500 A | 11/1985 | Sokira | |
| 4,764,853 A | 8/1988 | Thomas et al. | |
| 5,043,650 A | 8/1991 | Bhagwat et al. | |
| 5,174,645 A | 12/1992 | Chung | |
| 5,420,493 A | 5/1995 | Hargadon et al. | |
| 5,535,108 A | 7/1996 | Logsdon | |
| 5,550,452 A * | 8/1996 | Shirai | H02J 7/025 320/108 |
| 5,936,521 A | 8/1999 | Blackman | |
| 6,066,924 A | 5/2000 | Lederer | |
| 6,102,549 A | 8/2000 | Thomas et al. | |
| 6,688,752 B2 | 2/2004 | Moore | |
| 6,719,443 B2 | 4/2004 | Gutstein et al. | |
| 6,819,080 B2 * | 11/2004 | Barbeau | F21L 4/08 320/107 |
| 6,837,594 B2 | 1/2005 | Paquette et al. | |
| 7,033,042 B2 | 4/2006 | Lim | |
| 7,118,243 B2 | 10/2006 | McCavit et al. | |
| 7,125,142 B2 | 10/2006 | Wainwright | |
| 7,178,939 B2 * | 2/2007 | Tsai | F21S 6/001 362/190 |
| 7,252,423 B1 | 8/2007 | Wang | |
| 7,391,182 B2 | 6/2008 | Barbeau et al. | |
| 7,410,269 B2 | 8/2008 | Harrity et al. | |
| 7,824,627 B2 * | 11/2010 | Michaels | F21S 10/04 239/102.2 |
| 7,828,462 B2 | 11/2010 | Jensen et al. | |
| 8,210,708 B2 * | 7/2012 | Hau | F21S 6/001 320/108 |
| 8,454,190 B2 | 6/2013 | Hau et al. | |
| 2004/0037069 A1 * | 2/2004 | Blackbourn | F21S 6/001 362/161 |
| 2004/0051474 A1 | 3/2004 | Wong | |
| 2005/0196716 A1 * | 9/2005 | Haab | F21S 6/001 431/126 |
| 2005/0225984 A1 * | 10/2005 | Theobald | F21S 6/001 362/276 |
| 2005/0239007 A1 | 10/2005 | Dell'Aquila et al. | |
| 2006/0024627 A1 | 2/2006 | Platts | |
| 2007/0189562 A1 | 8/2007 | Chiu | |
| 2007/0223217 A1 * | 9/2007 | Hsu | F21S 6/001 362/183 |
| 2008/0094825 A1 * | 4/2008 | Silver | F21S 6/001 362/161 |
| 2008/0117634 A1 * | 5/2008 | Wong | F21S 6/001 362/276 |
| 2009/0290332 A1 | 11/2009 | Jacobs et al. | |
| 2013/0265748 A1 | 10/2013 | Hau et al. | |

OTHER PUBLICATIONS

Notice of Allowance for U.S. Appl. No. 12/273,337 mailed Mar. 26, 2012, 8 pages.
Final Office Action for U.S. Appl. No. 12/273,337 mailed Jan. 18, 2012, 17 pages.
Non-Final Office Action for U.S. Appl. No. 13/526,067 mailed Oct. 22, 2012, 23 pages.
Notice of Allowance for U.S. Appl. No. 13/526,067 mailed Feb. 6, 2013, 8 pages.
Non-Final Office Action for U.S. Appl. No. 13/908,571 mailed Sep. 6, 2013, 11 pages.
Final Office Action for U.S. Appl. No. 13/908,571 mailed Mar. 18, 2014, 20 pages.
Final Office Action for U.S. Appl. No. 13/098,571 mailed Sep. 30, 2014, 18 pages.

\* cited by examiner

INDUCTION RECHARGEABLE ELECTRONIC CANDLE SYSTEM

CROSS-REFERENCE TO RELATED APPLICATIONS INCORPORATED BY REFERENCE

The present application is a Continuation of U.S. patent application Ser. No. 13/908,571, filed Jun. 3, 2013, now abandoned, which is a Continuation of U.S. patent application Ser. No. 13/526,067, filed Jun. 18, 2012, now U.S. Pat. No. 8,454,190, which is a Continuation of U.S. patent application Ser. No. 12/273,337 filed Nov. 18, 2008, now U.S. Pat. No. 8,210,708, each of which is hereby incorporated by reference in its entirety.

BACKGROUND OF THE INVENTION

I. Field of the Invention

This invention relates generally to electronic candles used to simulate actual wax candles, and more particularly to a system for recharging a large plurality of such candles.

II. Discussion of the Prior Art

There are artificial candles on the market presently that replicate the look of a burning wax candle, but which incorporate a yellow LED and a suitable electronic controller for imparting a flickering illumination of the LED to simulate the glow of a burning wax candle. However, for the most part, those candles embody a rechargeable battery and a circuit that had to be plugged into a DC current source to effect recharging of the candle, one at a time.

Many restaurants often include a so-called votive candle on each table in the restaurant to add to the ambience of the place. A votive candle is generally 2.0 inches in height by 1.5 inches in diameter and is contained in a suitable holder, such as a glass cup. If one wished to substitute an electronic artificial candle for the real thing, a way would have to be devised to simultaneously recharge a large plurality of such artificial candles so that when fully charged, they may be distributed throughout the restaurant and turned on upon arrival of a patron at a given table.

The prior art, as represented by U.S. Pat. No. 6,819,080 to Barbeau et al, teaches a stand-alone recharging platter capable of charging a set number of artificial candles. Such stand-alone platters have a power cord for supply an electrical charge. If a restaurant needs to charge more candles than the platter is adapted to handle, the restaurant must plug multiple platters into multiple wall sockets.

Another concern on the part of a restaurant owner is the potential loss of such a candle through theft. The artificial candles, being both attractive and of more than negligible cost, loss through theft can be a problem.

A need therefore exists for a decorative artificial candle design that can be used in a restaurant environment as a table decoration and that is adapted to be recharged simultaneously with many other identical candles in unison rather than individually.

A need further exists for an artificial candle design that incorporates features that discourage theft.

A further need is an artificial candle that is more realistic in its operation than existing prior art artificial electronic candles currently available. Specifically, a need exists for an artificial candle that more accurately simulates a real wax candle in that it can be extinguished by a puff of air blown at it at close range.

SUMMARY OF THE INVENTION

The present invention provides a charging stand or tray that can be concatenated with a plurality of identical trays where each tray is capable of supporting a plurality of individual artificial electronic candles as they are simultaneously having their internal batteries recharged. Each of the individual candles may incorporate a position sensitive module capable of detecting whether a candle is otherwise than in an upright position and to provide an audible signal unless the candle is returned to its upright position within a prescribed time interval.

In accordance with a further feature of the invention, a suitable transducer can be incorporated into the individual candles where the transducer is capable of detecting pressure and temperature changes occasioned by a person blowing his/her breath onto the candle and causing the LED light source used to simulate the flame to be extinguished.

DESCRIPTION OF THE DRAWINGS

The foregoing features, objects and advantages of the invention will become apparent to those skilled in the art from the following detailed description of a preferred embodiment especially when considered in conjunction with the accompanying drawings in which like numerals in the several views refer to corresponding parts.

DESCRIPTION OF THE PREFERRED EMBODIMENT

Figure 1A:
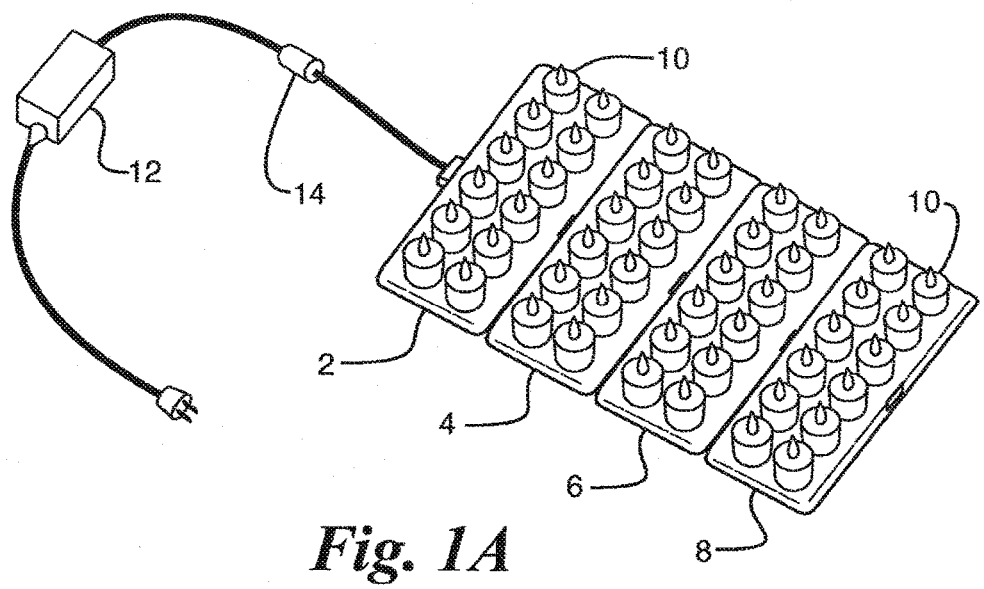
FIG. 1A is a pictorial view showing four charging trays joined together and populated with a plurality of artificial candles.

With reference to FIG. 1A, there is shown a plurality of electrically and mechanically interconnected artificial candle charging trays 2, 4, 6, 8 that are populated with a plurality of battery-operated artificial candles 10. Without limitation, each charging tray may hold up to a dozen artificial candles in which a rechargeable DC battery is connected through a semiconductor switch to a yellow LED and where the switch is, in turn, controlled by a programmed microprocessor chip such that the LED may be made to flicker much like the light given off by a real wax candle. Just how this is achieved will be explained in greater detail herein below.

With continued reference to FIG. 1A, power for the charging tray is derived from a conventional AC/DC adapter that when plugged into a wall socket at 110 volts produces a 12 volt DC output. Connected in the cable leading from the adapter 12 to the first recharging tray 2 is a current limiter circuit 14.

Figure 1B:
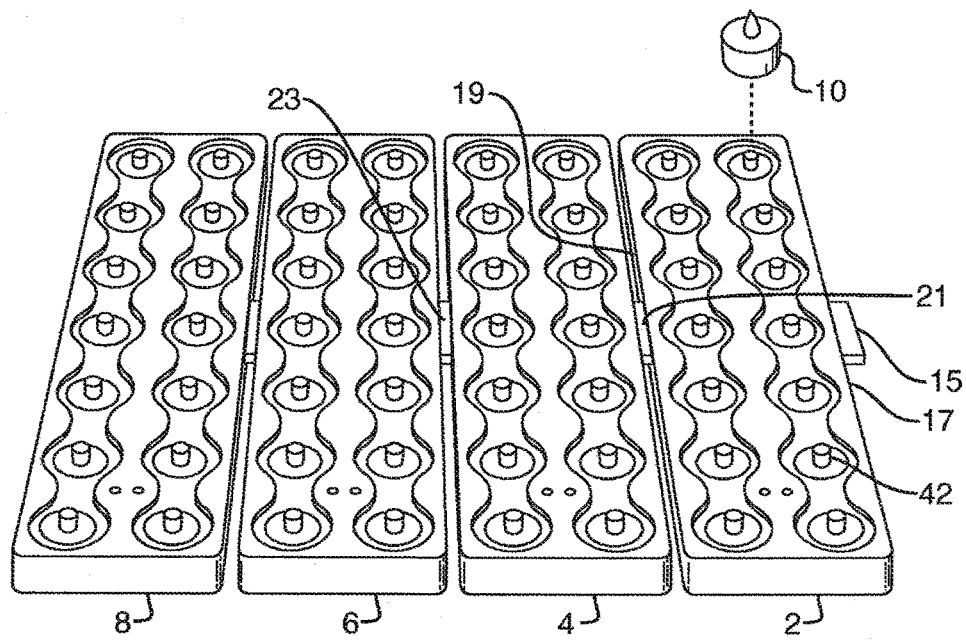
FIG. 1B is an enlarged view of four charging trays connected together and showing the plug and socket detail.

FIG. 1B illustrates the manner in which plural trays, 2, 4, 6 and 8, can be concatenated so that each is supplied with power from the AC to DC adapter, via the current limiter circuit 14. The DC input from the current limiter 14 enters through a plug 15 that projects laterally from a side edge 17 of the tray 2. Formed inwardly in the opposed side surface 19 of the tray 2 is a female socket dimensioned to accommodate the insertion of a male plug 21 that projects from the side surface of an identical tray 4. Likewise, tray 6 has a plug 23 mating with a socket in the side surface of the tray 4, etc. Contained within the hollow interior of the trays 2, 4, 6 and 8 are printed circuit boards and wiring that operatively connect the contacts of the plug 15 to corresponding terminals in the socket into which the plug 21 of the tray 4 is inserted. The manner of inner connection is shown in the electrical schematic diagram of FIG. 7.

Figure 2:
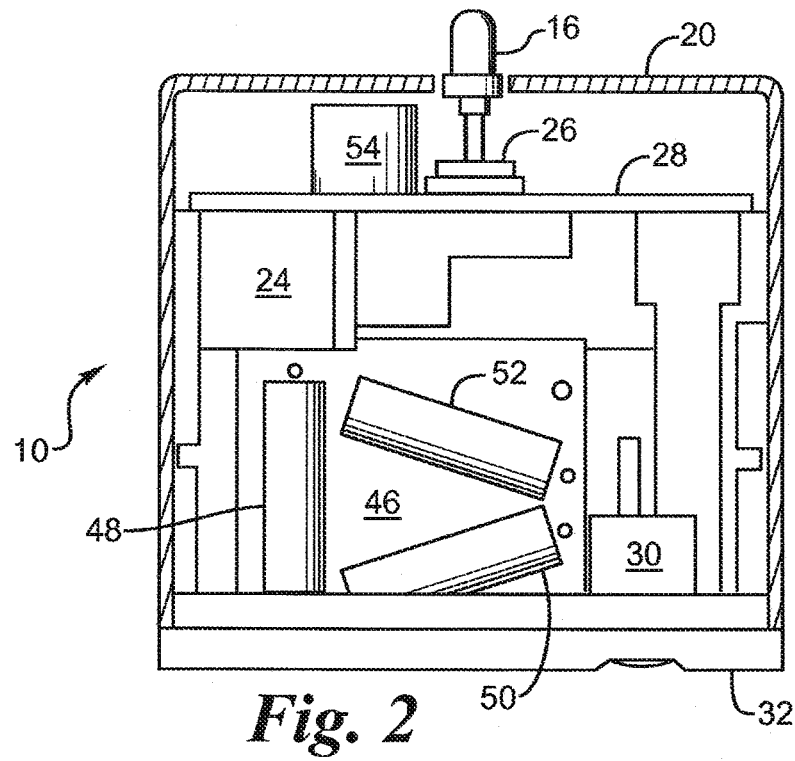
FIG. 2 is a side elevation view of the artificial candle with the decorative outer shroud removed.
Figure 3:
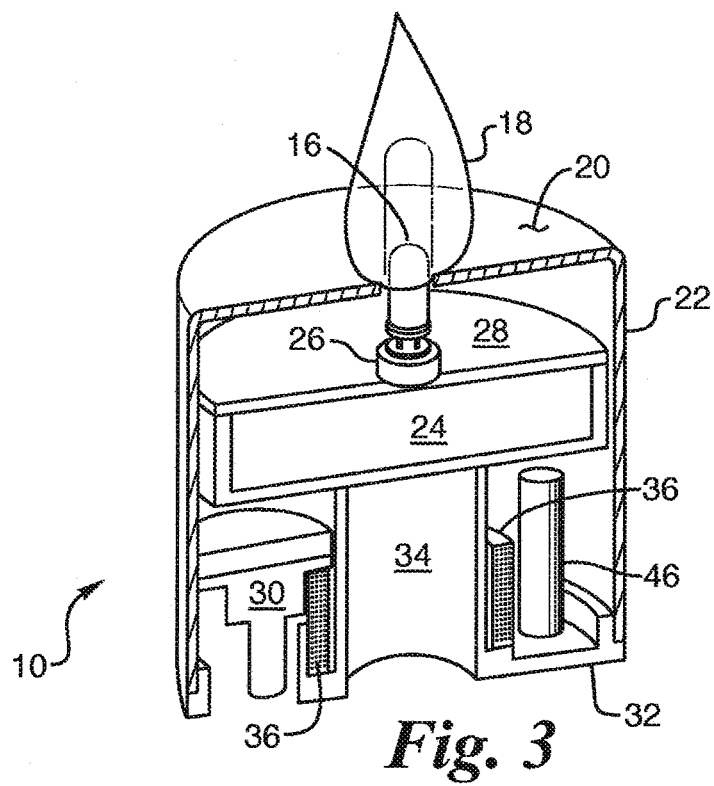
FIG. 3 is a cross-sectional view taken through the artificial candle incorporating an anti-theft feature.

Referring next to FIGS. 2 and 3, each of the battery operated artificial candles comprises a yellow LED 16 that simulates the candle flame. It is surrounded by a translucent bulb 18 (FIG. 3) having the tapered shape of a flame and used to defuse the light emanating there through. The LED 16 projects out through an aperture in the top surface 20 of the molded plastic candle housing 22 or shroud, which is generally a hollow right-circular cylinder that contains the electronic circuitry for powering the LED 16.

Figure 7:
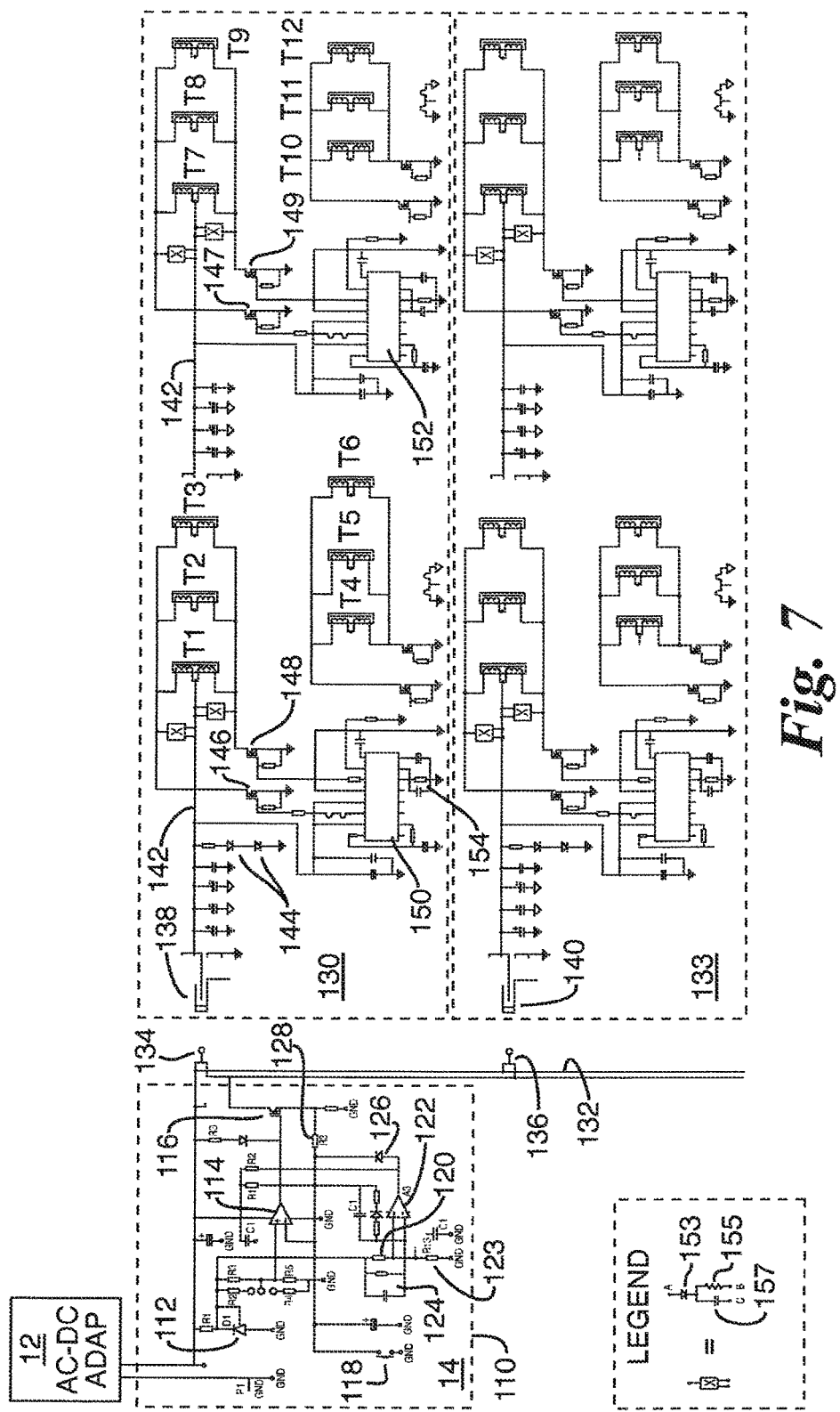
FIG. 7 is an electrical schematic diagram of an inner connected pair of charging trays and a current limiter circuit used therewith.

With continued reference to FIGS. 2 and 3, a rechargeable battery 24 is positioned directly below a socket 26 for the LED 16 and adjacent the underside of a printed circuit board assembly 28 on which much of the circuitry of FIG. 7 is disposed. A pushbutton "on/off" switch 30 is disposed within the housing 22 and is accessible through an aperture formed in the base 32 of the candle. The base also includes a bore 34 and surrounding the bore 34 is an electrical coil 36 or windings which, as will be further explained, acts as the secondary winding of a transformer whose primary winding is disposed about a ferrite core in a hollow post on the charging tray that is adapted to fit within the bore 34 of the artificial candle. The arrangement is more clearly shown in the cross-sectioned view of FIG. 4.

Figure 4:
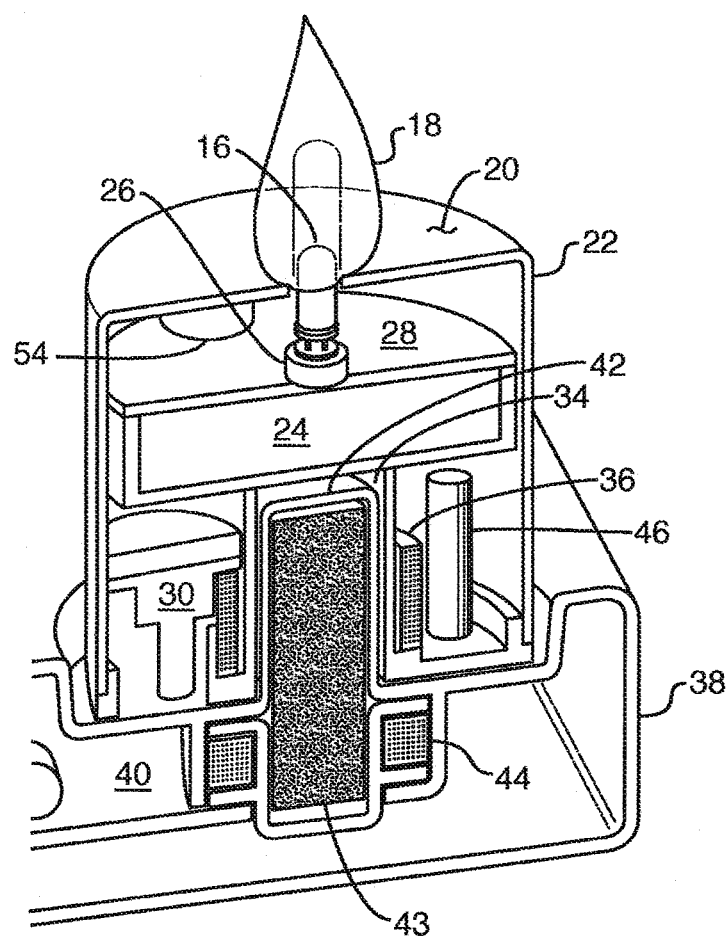
FIG. 4 is a view of a charging tray populated with artificial candles and cross-sectioned to show the engagement between a transformer primary winding forming part of the charging tray and a secondary winding disposed in the artificial candle.

As shown in FIG. 4, the recharging trays for the artificial candles include a hollow, box-like base 38 formed of injection molded plastic. Disposed within the interior of the base 38 is a printed circuit board 40 that contains the circuitry of one of the two recharging trays illustrated in the electrical schematic diagram of FIG. 7.

Formed into the top surface of the base 38 is a plurality of indented circular sockets dimensioned to receive a bottom portion of an artificial candle in each. Centrally located in each of the sockets and projecting vertically from the center thereof are cylindrical posts 42. Contained within each such post is a magnetic core 43 encircled by coil windings, as at 44, and which form the primary winding of a transformer that is inductively coupled to the coil 36 that surround the bore 34 in the candle when the candles are resident in the sockets of the base 38.

Referring back to FIG. 2, also contained within the cylindrical housing 22 of the artificial candle is a motion sensor 46. The motion sensor 46 includes three small tubes 48, 50 and 52 that contain a conductive ball in the lumens thereof, the balls being free to move between electrical contacts disposed at opposed ends of each of the tubes. Thus, for example, when the artificial candle is resting on a flat horizontal surface, the conductive balls will be at the lower end of each of the tubes 48, 50 and 52, but when the candle is tipped from its upright position, gravity will cause the conductive balls to shift in position to close a different set of contacts, thus indicating that the candle is no longer upright.

Also visible in FIG. 2 is a battery-operated buzzer 54 which will be made to sound whenever the artificial candle is not in its upright position for a predetermined length of time. Thus, for example, should a restaurant patron attempt to make off with a candle by placing it in a pocket or purse, the device will give off an audible sound to alert restaurant personnel that a candle is being taken.

Figure 5:
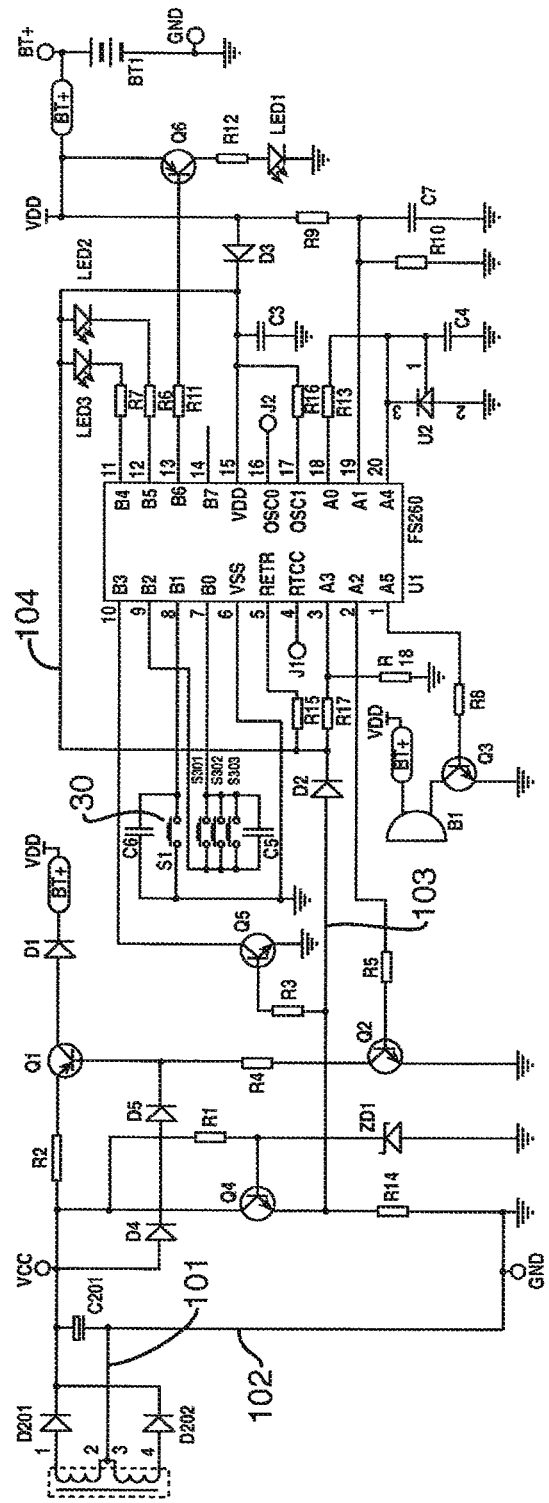
FIG. 5 is an electrical schematic diagram of the artificial candle incorporating the anti-theft feature.

FIG. 5 is an electrical schematic diagram of the circuitry contained within the housing 22 of the artificial candle incorporating the anti-theft feature. The transformer T has a center tapped winding where the center tap is connected by conductors 100 and 102 to circuit ground. The opposed outer ends of the secondary winding are connected through rectifier diodes D201 and D202 to a junction point VCC. A smoothing capacitor C201 is connected between that junction and the center tap terminal of the transformer winding, T.

Connected between the junction VCC and ground is a series combination of an NPN transistor Q4 and a resistor R14. Connected between the base electrode of Q4 and ground is a reference Zenar diode ZD1 and connected between the junction VCC and the base electrode of Q4 is a resistor R1.

A PNP transistor Q1 has its emitter electrode coupled to the junction VCC by a current limiting resistor R2 and the collector electrode of Q1 is connected through a diode D1 to a junction point VDD. The base electrode of Q1 is connected to ground through a series combination of a resistor R4 and the emitter to collector path of a PNP transistor Q2. More particularly, the emitter electrode of Q2 is connected directly to ground while its collector electrode connects to the base electrode of Q1 via the resistor R4.

A pair of diodes D4 and D5 are connected in series between the junction VCC and the base electrode of transistor Q1 the purpose of which is to apply an appropriate bias for transistor Q1.

Control over the mode of operation of the candle is dictated by a programmed microprocessor U1 which preferably comprises a Type FS260, an 8-bit microprocessor. A push-button off/on switch for the artificial candle, S1, is connected between ground and input pin B1 of the microprocessor and a capacitor C6 is connected directly in parallel with the switch S1. Connected between input terminals B0 and B2 are positioned sensing switches S301 and S302 and S303. These are the same devices as referred to by reference numerals 48, 50 and 52 in the drawing of FIG. 2. A debounce capacitor C5 is connected in parallel with these three position sensitive switches.

An NPN transistor Q5 has its emitter electrode tied to ground and its collector electrode connected to the input terminal B3 of the microprocessor U1. The base electrode of Q5 is connected through a biasing resistor R3 to the junction point between the emitter electrode of Q4 and the resistor R14. That junction is also connected by means of a conductor 103, a diode D2, and a resistor R17 to output terminal A3 of the microprocessor U1. The common junction between the diode D2 and the resistor R17 is coupled by a resistor R15 to the reset terminal RETB of the microprocessor and by a conductor 104 to the VDD terminal of the microprocessor U1.

A first LED, preferably green in color, has its anode electrode tied to the conductor 104 and its cathode electrode connected, via a resistor R7, to the output terminal B4 of the microprocessor. Likewise, a second LED, preferably red in color, has its anode electrode connected to the conductor 104 and its cathode electrode connected by a resistor R6 to output terminal B5 of the microprocessor.

The output terminal B6 of the microprocessor is connected through a series resistor R11 to the base electrode of a PNP transistor Q6 whose emitter electrode connects to the positive terminal of a rechargeable battery BT1 and whose negative electrode is connected to ground. The rechargeable battery, for example, may be a 3.6 volt 330 ma lithium battery, but limitation to that type of rechargeable cell is not to be inferred.

The collector electrode of a transistor Q6 connects to ground through a resistor R12 and a yellow LED, labeled LED 1, which is the flame LED 16 in FIGS. 2 and 3 of the drawings. The positive battery terminal BT+ is also connected through a diode D3 to the VDD terminal of the microprocessor thereby supplying its operating voltage. The cathode of the diode D3 connects to conductor 104 and a capacitor C3 connects between that conductor and ground. A resistor R16 couples the VDD terminal of the microprocessor to its OSC1 terminal.

With continued reference to FIG. 5, the anode electrode of the diode D3 connects through a series resistor R9 and a capacitor C7 to ground. Connected directly in parallel with the capacitor C7 is a further resistor R10. The common terminal between the resistor C7, the resistor R9 and the resistor R10 is tied to the input terminal A1 of the microprocessor.

Programmable shunt regulator U2 is connected between the microprocessor input terminal A4 and ground and its reference electrode is connected by means of a capacitor C4 to ground. The reference electrode is also directly connected to the device's cathode.

Completing the circuit of FIG. 5 is an audible signaling device or buzzer B1 having a first terminal thereof connected to the VDD terminal, i.e., the battery's positive terminal and the second terminal of the buzzer B1 connects through an NPN transistor switch Q3 to ground. The base electrode of Q3 has a resistor R8 connecting it to the terminal A5 of the microprocessor U1.

In operation, and assuming that the battery potential BT+ is below a certain potential and it is appropriately mounted on the charging tray with the post 42 located in the bore 34, transistor Q1 will be forward biased and a DC current resulting from rectification of the induced voltage across the secondary winding of the transformer T becomes available to charge the battery. When the battery becomes charged to the point where its voltage BT+ is at a predetermined value, the microprocessor is programmed to output a signal on its terminal A2 to reverse bias the transistor Q2 which has the effect of shutting off the charging current flow through the transistor Q1 to the battery.

With the battery fully charged and assuming the candles have been removed from the tray, depression on the on/off switch S1 inputs a ground signal to terminal B1 of U2 which has the effect of driving the transistor Q6 into conduction, whereby current flows to the candle lamp LED1 causing it to glow. The candle flame LED1 is made to flicker by the microprocessor suitably varying the on/off state of the transistor Q6. However, if the on/off switch S1 is depressed a second time, the microprocessor is programmed to cause a steady current to flow through transistor Q6, such that LED1 no longer flickers. A third depression of the on/off switch is effective to turn off the candle.

Assuming that the battery is fully charged, the candle has been removed from the base 38 and that the on/off switch has been depressed either once or twice in succession and then the candle set down on a flat, horizontal surface, such as on a patron's table, the LED1 will continue to glow. However, if the patron should now pick up the candle from the table and, in doing so, tip it so that its top surface 20 is non-horizontal, one or more of the position sensitive switches S301, S302 and S303 will reverse state and input a signal between microprocessor terminals B0 and B2. Upon detection of this condition for a programmed period, say 5 seconds, the microprocessor will issue a signal on output terminal A5 to turn on the transistor Q3 and complete a circuit from the battery through the buzzer to ground causing the buzzer to emit an audible signal that can attract attention of a restaurant employee. Turning on the buzzer B1 also results in the LED2 flashing on and off at one second intervals which is a further attention getter. This state will continue until the candle is returned to the charging tray that is located to be accessible only to restaurant employees.

Figure 6:
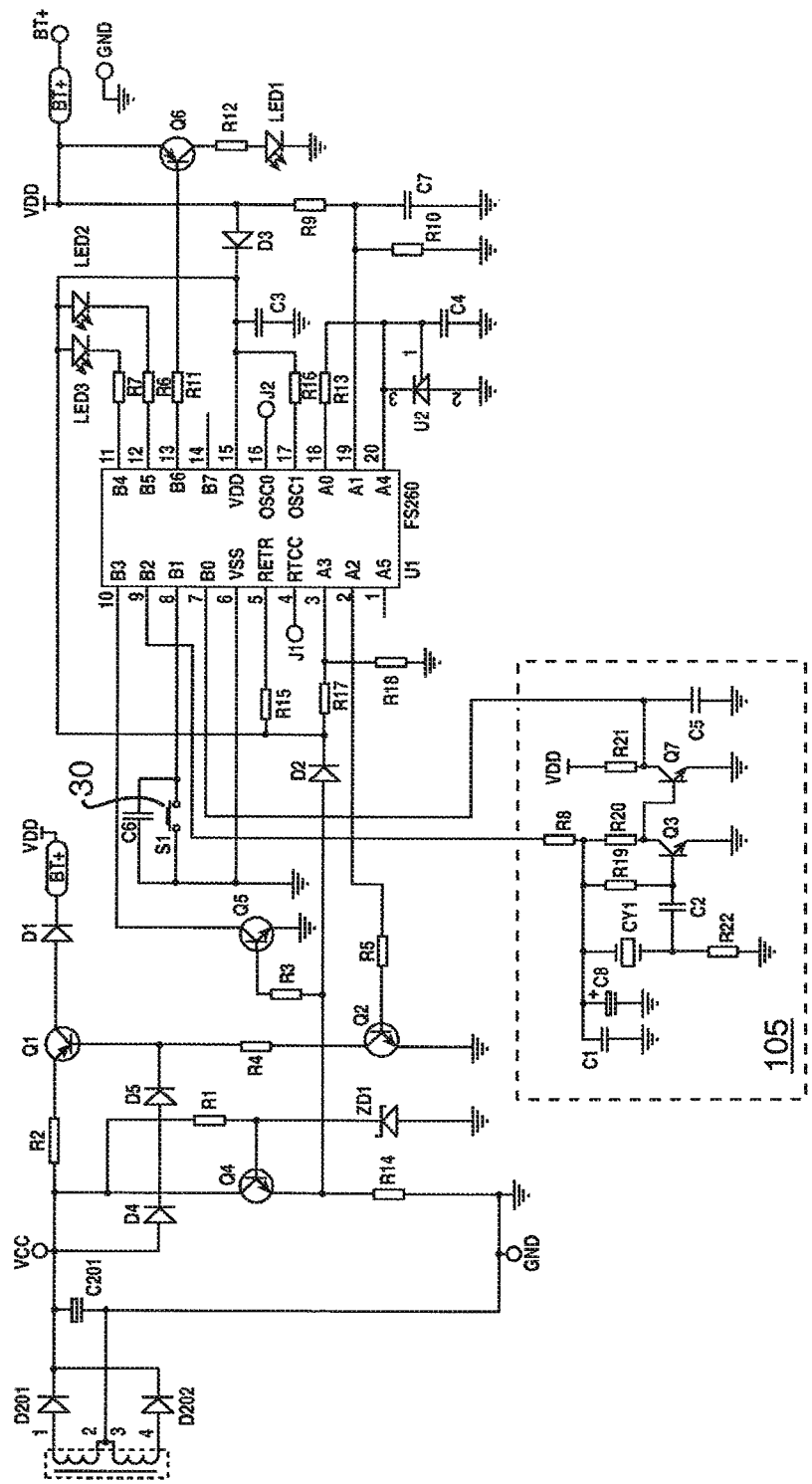
FIG. 6 is a schematic electrical diagram of the artificial candle incorporating the blow-out feature.

Turning next to FIG. 6, it is substantially identical in its construction to that of FIG. 5 except that the buzzer and position sensitive switches S301, S302 and S303 are eliminated and replaced with circuitry that adds further realism to the artificial candle. Specifically, if the flame LED is glowing in either its blink mode or its steady mode and a patron blows air at the flame, the flame will be extinguished.

As seen in FIG. 6, connected between the microprocessor input terminals B0 and B2 is the circuitry shown enclosed by the broken line box 105. It includes a PVDF pyro/piezo film transducer CY1 that possesses the property of being able to convert a temperature change and pressure wave into an electrical signal proportional to the amount of change. This signal is amplified by a two-stage amplifier including the transistors Q3 and Q7 and the microprocessor is programmed so that upon receipt of the "blow" signal from the transducer CY1, the transistor Q6 is turned off, thereby extinguishing LED1.

FIG. 7 is an electrical schematic diagram of the circuitry used to simultaneously recharge the batteries of a plurality of artificial candles heretofore described. The 110 volt AC to 12 volt DC adapter 12 provides its output to the current limitator circuit 14 contained within the broken line box 110. The current limitator circuit functions to limit the current draw by the attached charging trays to a maximum of 3.2 amperes and thereby preventing overloading of the adapter 12. Should the current draw by the connected recharging trays reach the limit of 3.2 amperes, the current limitator automatically cuts off the power being delivered to the recharging trays. The current limitator circuit includes a Type TL431 shunt regulator 112 whose cathode and reference electrode are connected through a jumper selectable voltage divider to the non-inverting input of an LM393 operational amplifier 114 and whose output connects to a Type IRFL024N power MOSFET operatively connected between a wire in the cable that is adapted to plug into the charging tray and ground. The inverting input of the op amp 114 connects through a manually operated reset switch 118 to ground.

The cathode electrode of the shunt regulator 112 is also coupled through a resistor 120 to the non-inverting input of an operational amplifier 122. The resistor 120 along with a further resistor 123 constitutes a voltage divider. The cathode electrode of the shunt regulator 112 also connects through a parallel RC circuit 124 to the inverting input of the op amp 122. The op amp 122 has its output electrode connected through a diode 126 to the inverting input of the op amp 114 and through a resistor 128 to the gate electrode of the power MOSFET 116.

Those skilled in the art will appreciate that the shunt regulator 112 functions much like a Zenar diode to provide a predetermined reference for the op amps 114 and 122 and that when the current being drawn from the AC/DC adapter 12 approaches 3.2 ampere, the power MOSFET 116 is driven into conduction effectively disconnecting the AC/DC adapter source from its load.

The recharging tray circuits are shown enclosed by broken line boxes 130 and 133. While only two such recharging tray circuits are shown in FIG. 7, it is to be appreciated that additional trays may be concatenated by operatively joining them to the two conductor cable 132, via plugs as at 134 and 136, that are adapted to mate with sockets or jacks 138 and 140, respectively, in the manner explained with reference to FIG. 1B. In that the two illustrated recharging trays are identical, it will only be necessary to explain the constructional features of one of them and, in this regard, attention will be given to the circuitry shown enclosed by the broken line box 130.

With the plug 134 mated with the jack 138, a current path is established to a conductor 142 that connects to the center tap terminals of the primary windings of transformers T1 through T12. It will be recalled that the cores of the transformers T1-T12 are individually disposed within hollow posts projecting upward from the center of the pockets on the charging tray. The "ON" state of the charging tray is indicated by means of a pair of LEDs 144 connected between conductor 142 and ground.

The two outer terminals of the center tapped windings of transformers T1 through T12 are connected through, for example, MOSFET switches 146, 147, 148, and 149, and the ON/OFF state of these switches is controlled by one of the pulse width modulator chips 150 and 152. Without limitation, they may each comprise a Type SG3525A integrated circuit device available from ST Microelectronics or an ESM6820A dual N-Channel enhancement mode FET. Such circuits are frequently used in the design of various types of switching power supplies. Thus, the duty cycle of the pulsitile current made to flow through the transformer windings of T1 through T12 can be controlled. To protect the MOSFET switches 146-149 from exposure to peak voltages generated by the coils of the transformer windings, a diode 153 and a parallel RC circuit 155, 157 is connected between the outer ends of the coils and their center tap.

The switching rate of the MOSFET switches 146-149 is controlled by the selection of the RC time constant of the circuit connected to the "R" and "C" input terminals of the integrated pulse width modulator chips 150 and 152. The RC timing circuit for the pulse width modulator chip 150 is identified by numeral 154 in FIG. 7.

When the artificial candles are placed on the recharging tray in the manner shown in FIG. 4, the winding contained within the candle housing is exposed to the magnetic flux generated by the transformer coils of T1-T12 and converted by the rectifiers D201 and D202 to a DC current for recharging the candles' batteries 24.

The microprocessor chip U1 contained within the candle causes the battery to be charged with only 30% of the maximum set current for a period of 20 minutes. Following that, the batteries in the candles will be charged at 100% of the set current until such time that it is detected that the battery voltage has reached 4.2 volts, indicating a fully charged condition. At this time, the glowing red LED (LED 2) will switch off and the green LED (LED 3) is illuminated to indicate a fully charged condition of the candle battery. As already mentioned, the microprocessor U1 in the candle receives a signal when the battery has become fully charged up to 4.3 volts and will cause the transistor Q1 to become non-conductive, thereby cutting off the charging current.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An electronic candle system comprising:
   (a) a plurality of artificial candles, each comprising a housing containing an LED light source, a rechargeable DC battery for energizing the LED light source, a transformer secondary winding and an AC to DC converter circuit coupled between the transformer winding and the DC battery; and
   (b) a plurality of box-like trays, each having a top surface, a bottom surface and four mutually perpendicular side surfaces defining a hollow interior, a first side surface having a laterally projecting plug member and an opposed side surface having a socket for receiving the plug member of an adjacently positioned tray therein, each said tray supporting a plurality of said artificial candles at defined locations thereon, said plurality of trays including a transformer primary winding proximate each of said defined locations;
   (c) means for applying a DC voltage to a string of such trays by having the plug member of one tray inserted into the socket of an adjacent tray and connecting the plug member of a first tray in the string to a DC voltage source;
   (d) a DC to AC converter in each said tray connected to receive said DC voltage and producing an AC output to the primary windings whereby an AC voltage is induced across the secondary winding of candles disposed at said defined locations, said AC to DC converter in each said candles thereby producing a DC current for recharging the DC battery in each such candles; wherein
   each of the candles further includes a first semiconductor switch operatively disposed between the AC to DC converter and the battery, and a second semiconductor switch connected in series with the LED light source and the battery;
   (e) a programmed microprocessor for controlling the conductivity of the first semiconductor switch and the second semiconductor switch;
   (f) a piezoelectric transducer responsive to a change in air pressure for sending a signal to the microprocessor, the microprocessor being responsive to said signal for turning off the second semiconductor switch and extinguishing the LED light source.

2. The electronic candle system of claim 1 wherein the piezoelectric transducer comprises a PVDF film.

3. The electronic candle system of claim 1 further including a manually operable on/off switch connected to the microprocessor for controlling the mode of operation of the LED light source between one of off, blinking or on steady.

4. The electronic candle system of claim 1 wherein the LED light source is a yellow LED.

5. The electronic candle system of claim 1 wherein the LED light source is surrounded by a translucent bulb resembling a shape of a flame to defuse the light emanating therethrough.

6. The electronic candle system of claim 1 wherein each artificial candle includes a housing that is shaped as a hollow right-circular cylinder.

7. The electronic candle system of claim 1 wherein the DC to AC converter in each said tray applies an AC signal to the primary windings comprises a pulse width modulator.

8. The electronic candle system of claim 7 wherein the primary windings have a center tap connected to a DC current source and a pair of outer terminals and further including semiconductor switching means connected between the pair of outer terminals and ground and where the semiconductor switching means are driven by the pulse width modulator.

9. The electronic candle system of claim 8 wherein the DC current source includes means for limiting the current being collectively drawn by the transformer primary windings to a predetermined maximum value.

10. The electronic candle system of claim 1 further including a position sensing transducer disposed within the housing and adapted to provide an input signal to the microprocessor when the candle is in other than an upright position; and an audible alarm device connected in series with a third semiconductor switch across the battery, the conductivity of the third semiconductor switch being controlled by the microprocessor whereby the alarm device is made to sound if the candle remains in other than an upright position for a predetermined time period.

11. The electronic candle system of claim 10 and further including a visible indicator controlled by the microprocessor to blink on and off at a programmed rate upon detection that the candle is in other than an upright position.

12. The electronic candle system of claim 11 wherein the audible alarm device and the visible indicator once triggered remain active until the candle is returned to a defined location on the charge tray.

13. The electronic candle system of claim 1 wherein the transformer primary windings at each of the defined locations are disposed about a magnetic core that project vertically from the center of a cylindrical well formed in the tray.

14. The electronic candle system of claim 13 wherein each of the candles includes a housing having a top surface, a base member and a generally cylindrical side wall, the base member including a hollow sleeve extending perpendicularly and concentrically upward within the housing, the sleeve adapted to receive the magnetic core of a primary winding therein.

15. The electronic candle system of claim 14 wherein the secondary winding surrounds the hollow sleeve.

16. The electronic candle system of claim 15 wherein the LED light source projects through an opening in the top surface of the housing.

* * * * *